US010291689B2

(12) United States Patent
Parikh et al.

(10) Patent No.: US 10,291,689 B2
(45) Date of Patent: May 14, 2019

(54) SERVICE CENTRIC VIRTUAL NETWORK FUNCTION ARCHITECTURE FOR DEVELOPMENT AND DEPLOYMENT OF OPEN SYSTEMS INTERCONNECTION COMMUNICATION MODEL LAYER 4 THROUGH LAYER 7 SERVICES IN A CLOUD COMPUTING SYSTEM

(71) Applicant: AT&T Intellectual Property I, L.P., Atlanta, GA (US)

(72) Inventors: Anisa Parikh, Holmdel, NJ (US); Neela R. Atluri, Marlboro, NJ (US); Paritosh Bajpay, Edison, NJ (US); Sekar Ganesan, Ocean, NJ (US); Shobhna Goyal, Marlboro, NJ (US); Shiv Kumar, Marlboro, NJ (US); Magda K. Nassar, Tinton Falls, NJ (US); Satyendra Tripathi, E Brunswick, NJ (US); Ralph Utano, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/464,261

(22) Filed: Aug. 20, 2014

(65) Prior Publication Data
US 2016/0057209 A1    Feb. 25, 2016

(51) Int. Cl.
*H04L 12/24*    (2006.01)
*H04L 29/08*    (2006.01)
*H04W 76/14*    (2018.01)

(52) U.S. Cl.
CPC .......... *H04L 67/10* (2013.01); *H04L 41/5051* (2013.01); *H04L 69/321* (2013.01);
(Continued)

(58) Field of Classification Search
CPC ........ H04L 29/00; H04L 41/00; H04L 67/00; H04L 67/10
(Continued)

(56) References Cited

U.S. PATENT DOCUMENTS 7,466,710 B1    12/2008    Clemm et al.
7,574,496 B2    8/2009    Mccrory et al.
(Continued)

OTHER PUBLICATIONS

Marian, "virtualizing the network services—the telecom cloud", Mar. 28, 2014.*
(Continued)

*Primary Examiner* — Jeffrey R Swearingen
*Assistant Examiner* — Messeret F Gebre
(74) *Attorney, Agent, or Firm* — Hartman & Citrin LLC

(57) ABSTRACT

According to one aspect disclosed herein, a service centric virtual network function architecture can be used for development and deployment of services in a cloud computing system. The cloud computing system can include a plurality of compute resources and a plurality of memory resources. A portion of the plurality of memory resources can include virtual machine monitor instructions. The virtual machine monitor instructions can be executed by a first portion of the plurality of compute resources to perform operations. In particular, the virtual machine monitor instructions can be executed by the first portion of the plurality of compute resources to instantiate a virtual network function to be executed by a second portion of the plurality of compute resources. The virtual network function can include at least a portion of a decomposition of a physical network function that supports at least a portion of a telecommunications service.

19 Claims, 7 Drawing Sheets

(52) U.S. Cl.
CPC ............. *H04W 76/14* (2018.02); *H04L 41/12* (2013.01); *H04L 41/5087* (2013.01)

(58) Field of Classification Search
USPC .................................................. 709/204, 203
See application file for complete search history.

(56) References Cited

U.S. PATENT DOCUMENTS

| | | |
|---|---|---|
| 7,603,671 B2 | 10/2009 | Liu |
| 7,818,002 B2 | 10/2010 | Bajko et al. |
| 7,869,364 B2 | 1/2011 | Griffith et al. |
| 8,032,413 B2 | 10/2011 | Carlson |
| 8,190,740 B2 | 5/2012 | Stienhans et al. |
| 8,209,415 B2 | 6/2012 | Wei |
| 8,218,557 B2 | 7/2012 | Kean et al. |
| 8,244,559 B2 | 8/2012 | Horvitz et al. |
| 8,250,215 B2 | 8/2012 | Stienhans et al. |
| 8,271,653 B2 | 9/2012 | Dehaan |
| 8,276,140 B1 | 9/2012 | Beda et al. |
| 8,433,802 B2 | 4/2013 | Head et al. |
| 8,514,868 B2 | 8/2013 | Hill |
| 8,515,433 B2 | 8/2013 | Vaswani et al. |
| 8,572,612 B2 | 10/2013 | Kern |
| 8,606,878 B2 | 12/2013 | Ferris |
| 8,615,745 B2 | 12/2013 | Blainey et al. |
| 8,615,746 B2 | 12/2013 | Blainey et al. |
| 8,656,019 B2 | 2/2014 | Chikando et al. |
| 8,700,946 B2 | 4/2014 | Reddy et al. |
| 8,724,620 B2 | 5/2014 | Ku et al. |
| 8,739,157 B2 | 5/2014 | Ho et al. |
| 8,832,669 B2 | 9/2014 | Blainey et al. |
| 8,959,484 B2 | 2/2015 | Pinnix |
| 9,621,428 B1 | 4/2017 | Lev et al. |
| 2005/0027870 A1 | 2/2005 | Trebes, Jr. |
| 2005/0176428 A1 | 8/2005 | Gabor et al. |
| 2006/0146792 A1* | 7/2006 | Ramachandran ... H04L 12/6418 370/352 |
| 2007/0036151 A1 | 2/2007 | Baeder |
| 2007/0106769 A1 | 5/2007 | Liu |
| 2008/0025221 A1 | 1/2008 | Lipps |
| 2008/0112411 A1 | 5/2008 | Stafford |
| 2008/0209007 A1 | 8/2008 | Gurecki |
| 2008/0215736 A1 | 9/2008 | Astrom et al. |
| 2008/0254795 A1 | 10/2008 | Ratcliffe |
| 2009/0067409 A1 | 3/2009 | Ku |
| 2009/0097398 A1 | 4/2009 | Belinchon Vergara et al. |
| 2009/0116505 A1 | 5/2009 | Bhatia et al. |
| 2009/0300210 A1 | 12/2009 | Ferris |
| 2010/0136970 A1 | 6/2010 | Mui et al. |
| 2010/0274680 A1 | 10/2010 | Carlson |
| 2010/0296443 A1 | 11/2010 | Hirano et al. |
| 2011/0093584 A1 | 4/2011 | Qiu et al. |
| 2011/0117888 A1 | 5/2011 | Klein et al. |
| 2011/0119312 A1 | 5/2011 | Chopra et al. |
| 2011/0119729 A1 | 5/2011 | Bergeson et al. |
| 2011/0126168 A1 | 5/2011 | Ilyayev |
| 2011/0145836 A1 | 6/2011 | Wheeler et al. |
| 2011/0252420 A1 | 10/2011 | Tung et al. |
| 2011/0295996 A1 | 12/2011 | Qiu et al. |
| 2011/0307886 A1 | 12/2011 | Thanga |
| 2012/0011077 A1 | 1/2012 | Bhagat |
| 2012/0030331 A1 | 2/2012 | Dimitrios |
| 2012/0072581 A1 | 3/2012 | Tung et al. |
| 2012/0096045 A1 | 4/2012 | Moore et al. |
| 2012/0102183 A1 | 4/2012 | Murakami et al. |
| 2012/0124211 A1* | 5/2012 | Kampas ..................... G06F 9/50 709/226 |
| 2012/0131591 A1 | 5/2012 | Moorthi et al. |
| 2012/0158921 A1 | 6/2012 | Asveren et al. |
| 2012/0203823 A1 | 8/2012 | Manglik et al. |
| 2012/0281706 A1 | 11/2012 | Agarwal et al. |
| 2012/0297059 A1 | 11/2012 | Bross |
| 2012/0300615 A1 | 11/2012 | Kempf et al. |
| 2012/0303835 A1 | 11/2012 | Kempf et al. |
| 2012/0311154 A1 | 12/2012 | Morgan |
| 2013/0031550 A1 | 1/2013 | Choudhury et al. |
| 2013/0054670 A1 | 2/2013 | Keyes |
| 2013/0091284 A1 | 4/2013 | Rothschild |
| 2013/0091285 A1 | 4/2013 | Devarakonda et al. |
| 2013/0124401 A1 | 5/2013 | Del |
| 2013/0124712 A1 | 5/2013 | Parker |
| 2013/0145367 A1 | 6/2013 | Moss et al. |
| 2013/0182702 A1* | 7/2013 | Ku ..................... H04L 29/1216 370/352 |
| 2013/0188489 A1 | 7/2013 | Sato |
| 2013/0227673 A1 | 8/2013 | Yoon |
| 2013/0268913 A1 | 10/2013 | Anderson et al. |
| 2013/0286861 A1 | 10/2013 | Smith et al. |
| 2013/0291052 A1 | 10/2013 | Hadar et al. |
| 2013/0303114 A1 | 11/2013 | Ahmad et al. |
| 2013/0304904 A1 | 11/2013 | Mouline et al. |
| 2013/0311778 A1 | 11/2013 | Cherukuri et al. |
| 2013/0326036 A1 | 12/2013 | Heumesser et al. |
| 2013/0344897 A1 | 12/2013 | Pierce, II et al. |
| 2014/0010084 A1 | 1/2014 | Kavunder et al. |
| 2014/0032850 A1 | 1/2014 | Phelan et al. |
| 2014/0033268 A1 | 1/2014 | Julisch et al. |
| 2014/0059226 A1 | 2/2014 | Messerli et al. |
| 2014/0068611 A1 | 3/2014 | McGrath et al. |
| 2014/0068703 A1 | 3/2014 | Bzlus et al. |
| 2014/0074973 A1 | 3/2014 | Kumar et al. |
| 2014/0082699 A1 | 3/2014 | Eicken et al. |
| 2014/0086177 A1 | 3/2014 | Adjakple et al. |
| 2014/0109188 A1 | 4/2014 | Pavlov et al. |
| 2014/0112139 A1 | 4/2014 | Allan et al. |
| 2014/0115578 A1 | 4/2014 | Cooper et al. |
| 2014/0115583 A1 | 4/2014 | Lee et al. |
| 2014/0123129 A1 | 5/2014 | Risbood et al. |
| 2014/0130038 A1 | 5/2014 | Lucovsky et al. |
| 2014/0146673 A1 | 5/2014 | Parker |
| 2014/0149485 A1 | 5/2014 | Sharma et al. |
| 2014/0149492 A1 | 5/2014 | Ananthanarayanan et al. |
| 2014/0156850 A1 | 6/2014 | Hunt |
| 2014/0189109 A1 | 7/2014 | Jang |
| 2014/0201374 A1* | 7/2014 | Ashwood-Smith ..... H04L 49/70 709/226 |
| 2014/0279201 A1 | 9/2014 | Iyoob et al. |
| 2014/0280848 A1 | 9/2014 | Modh et al. |
| 2014/0280918 A1 | 9/2014 | Grandhe et al. |
| 2014/0280964 A1 | 9/2014 | Farooq et al. |
| 2014/0280966 A1 | 9/2014 | Sapuram et al. |
| 2014/0282037 A1 | 9/2014 | Narasimhan et al. |
| 2014/0282525 A1 | 9/2014 | Sapuram et al. |
| 2014/0282536 A1 | 9/2014 | Dave et al. |
| 2014/0317166 A1 | 10/2014 | Iyoob et al. |
| 2014/0317293 A1* | 10/2014 | Shatzkamer ............ G06F 9/455 709/226 |
| 2015/0007169 A1 | 1/2015 | Li et al. |
| 2015/0033365 A1 | 1/2015 | Mellor et al. |
| 2015/0063166 A1 | 3/2015 | Sif |
| 2015/0120890 A1 | 4/2015 | Ghai |
| 2015/0142958 A1 | 5/2015 | Tamura |
| 2015/0149611 A1 | 5/2015 | Lissack |
| 2015/0180730 A1 | 6/2015 | Felstaine |
| 2015/0180948 A1 | 6/2015 | Shao |
| 2015/0295750 A1 | 10/2015 | Blanco |
| 2015/0326535 A1 | 11/2015 | Rao et al. |
| 2015/0347264 A1 | 12/2015 | Mohammed |
| 2015/0347759 A1 | 12/2015 | Cabrera |
| 2015/0358248 A1 | 12/2015 | Saha et al. |
| 2015/0363423 A1 | 12/2015 | Utgikar |
| 2015/0378703 A1 | 12/2015 | Govindaraju et al. |
| 2016/0013985 A1 | 1/2016 | Reddy et al. |
| 2016/0028434 A1 | 1/2016 | Kerpez et al. |
| 2016/0036835 A1 | 2/2016 | Lietz |
| 2016/0036983 A1 | 2/2016 | Korolev et al. |
| 2016/0047566 A1 | 2/2016 | Haga et al. |
| 2016/0080496 A1 | 3/2016 | Falanga et al. |
| 2016/0112875 A1 | 4/2016 | Kasravi et al. |
| 2016/0188877 A1 | 6/2016 | Simha |
| 2016/0216994 A1 | 7/2016 | Sefidcon et al. |

(56) References Cited

U.S. PATENT DOCUMENTS

2016/0241446 A1     8/2016    Gupte et al.
2017/0063598 A1*   3/2017    Zhu .................... H04L 41/5041

OTHER PUBLICATIONS

White paper from ONUG board of directors, "Open networking challenges and opportunities", Jul. 2014.*
CloudNFV, "Network function virtualization", Aug. 12, 2013.*
S. Beereddy and K. Sirupa, "NFV use case—Delivering virtual CPE with multi-vendor VNF orchestration," 2015 IEEE Conference on Network Function Virtualization and Software Defined Network (NFV-SDN), San Francisco, CA, 2015, pp. 25-27.*
Beereddy, Srini, "NFV use case—delivering virtual CPE with multi-vendor VNF orchestration", 2015 IEEE Conference on Network Function Virtualization and Software-Defined Networks (NFV-SDN), pp. 25-27; 226.*
"Table of contents," 2015 IEEE Conference on Network Function Virtualization and Software Defined Network (NFV-SDN), San Francisco, CA, 2015, pp. 1-7.*
U.S. Office Action dated Apr. 10, 2015 in U.S. Appl. No. 14/464,283.
U.S. Office Action dated Feb. 18, 2016 in U.S. Appl. No. 14/464,241.
U.S. Office Action dated Dec. 17, 2015 in U.S. Appl. No. 14/464,283.
U.S. Office Action dated Aug. 12, 2015 in U.S. Appl. No. 14/464,283.
Binz, Tobias, et al. "Portable Cloud Services Using TOSCA." IEEE Internet Computing 16.3 (2012).
Somorovsky, Juraj, et al. "All your clouds are belong to us: security analysis of cloud management interfaces." Proceedings of the 3rd ACM workshop on Cloud computing security workshop. ACM, 2011.
Xu, Cheng-Zhong, Jia Rao, and Xiangping Bu. "URL: A unified reinforcement learning approach for autonomic cloud management." Journal of Parallel and Distributed Computing 72.2 (2012): 95-105.
Rochwerger, Benny, et al. "Reservoir-when one cloud is not enough." IEEE computer 44.3 (2011): 44-51.
Sotomayor, Borja, et al. "Virtual infrastructure management in private and hybrid clouds." Internet Computing, IEEE 13.5 (2009): 14-22.
Harmer, Terence, et al. "An application-centric model for cloud management." Services (Services-1), 2010 6th World Congress on. IEEE, 2010.
Stanek, Jan, Lukas Kencl, and Jiri Kuthan. "Characteristics of real open SIP-Server traffic." Passive and Active Measurement. Springer Berlin Heidelberg, 2013.
Kim, Jong Yul, and Henning Schulzrinne. "SipCloud: dynamically scalable SIP proxies in the cloud." Proceedings of the 5th International Conference on Principles, Systems and Applications of IP Telecommunications. ACM, 2011.
Scholler, Marcus, et al. "Resilient deployment of virtual network functions." Ultra Modern Telecommunications and Control Systems and Workshops (ICUMT), 2013 5th International Congress on. IEEE, 2013.
"Network Functions Virtualisation (NFV); Use Cases", ETSI, Oct. 2013.
"Virtualizing Network Services—the Telecom Cloud", Ericsson, Mar. 28, 2014.
"The Role of Layer 4-7 Services in Scaling Applications for the Cloud-Computing Data Center", Cisco, 2011.
Kächele, Steffen, et al. "Beyond IaaS and PaaS: An extended cloud taxonomy for computation, storage and networking." Proceedings of the 2013 IEEE/ACM 6th International Conference on Utility and Cloud Computing. IEEE Computer Society, 2013.
Ravindran, Ravishankar, et al. "Towards software defined ICN based edge-cloud services." Cloud Networking (CloudNet), 2013 IEEE 2nd International Conference on. IEEE, 2013.
"Software Defined Network and Network Functions Virtualization", Vikram Nair, 2014.
Manzalini, Antonio, and Roberto Saracco. "Software Networks at the Edge: A Shift of Paradigm." Future Networks and Services (SDN4FNS), IEEE, 2013.
Manzalini, Antonio, et al. "Clouds of virtual machines in edge networks."Communications Magazine, IEEE 51.7 (2013).
"The Real-Time Cloud", Ericsson, Feb. 2014.
U.S. Office Action dated Apr. 6, 2016 in U.S. Appl. No. 14/464,222.
U.S. Office Action dated Jul. 12, 2016 in U.S. Appl. No. 14/464,283.
U.S. Office Action dated Oct. 20, 2016 in U.S. Appl. No. 14/464,212.
U.S. Office Action dated Oct. 31, 2016 in U.S. Appl. No. 14/464,283.
U.S. Office Action dated Nov. 2, 2016 in U.S. Appl. No. 14/464,222.
U.S. Office Action dated Apr. 20, 2017 in U.S. Appl. No. 14/464,222.
U.S. Office Action dated Oct. 20, 2016 in U.S. Appl. No. 14/464,254.
U.S. Interview Summary dated Jun. 2, 2017 in U.S. Appl. No. 14/464,283.
U.S. Notice of Allowance dated Jun. 2, 2017 in U.S. Appl. No. 14/464,283.
U.S. Office Action dated Nov. 17, 2017 in U.S. Appl. No. 14/464,222.
U.S. Office Action dated Jun. 27, 2018 in U.S. Appl. No. 15/295,193.
U.S. Office Action dated Apr. 13, 2018 in U.S. Appl. No. 14/464,222.
U.S. Office Action dated Nov. 27, 2018 in U.S. Appl. No. 15/295,193.

* cited by examiner

SERVICE CENTRIC VIRTUAL NETWORK FUNCTION ARCHITECTURE FOR DEVELOPMENT AND DEPLOYMENT OF OPEN SYSTEMS INTERCONNECTION COMMUNICATION MODEL LAYER 4 THROUGH LAYER 7 SERVICES IN A CLOUD COMPUTING SYSTEM

BACKGROUND

Today, many services are implemented on a network platform that is made up of special-purpose vendor-specific proprietary hardware that is tightly coupled with one or more software applications. In addition, although Third Generation Partnership Project ("3GPP") standards are adhered to by network service providers, different interpretations of the standards can cause added complexity in dealing with multi-vendor interoperability. As a result, the introduction of new services, the augmentation of network capacity, and the adoption of new technology all may be delayed, since the deployment of new network elements and new applications often requires at least six months advanced planning and capital commitment. Moreover, each time a new service is introduced or changes to a network node configuration are required, extensive regression testing is needed to insure no adverse impacts to the other network nodes and services.

SUMMARY

Concepts and technologies disclosed herein are directed to a service centric virtual network function ("VNF") architecture for development and deployment of services, such as Open Systems Interconnection ("OSI") communication model layer 4 through layer 7 services, in a cloud computing system. The VNF architecture overcomes at least the aforementioned problems by decomposing network hardware and software functions used for layer 4-7 services into a set of VNFs. This decomposition can be implemented in a granular manner to obtain the flexibility to instantiate only the VNF(s) that are to be used for a service and customize the VNF(s) with parameters specific to the service. In addition, VNFs can be grouped to optimize support for each service. The location of the VNFs also can be tailored to be service specific. Deployment decisions, such as centralized versus regional, can be made at the service level. Additionally, the VNFs can be exposed to any service provider so that the service provider can build one or more layer 4-7 services.

According to one aspect disclosed herein, a service centric VNF architecture can be used for development and deployment of services in a cloud computing system. The cloud computing system can include a plurality of compute resources and a plurality of memory resources. A portion of the plurality of memory resources can include virtual machine monitor ("VMM") instructions. The VMM instructions can be executed by a first portion of the plurality of compute resources to perform operations. In particular, the VMM instructions can be executed by the first portion of the plurality of compute resources to instantiate a VNF to be executed by a second portion of the plurality of compute resources. The VNF can include at least a portion of a decomposition of a physical network function that supports at least a portion of a telecommunications service.

In some embodiments, the cloud computing system also includes a VNF catalog. The VNF catalog can include vendor information associated with one or more vendors that provide the VNF. The VNF catalog can include capability information associated with one or more capabilities of the VNF.

In some embodiments, the VMM instructions can be executed by the first portion of the plurality of compute resources to perform further operations. In particular, the VMM instructions can be executed by the first portion of the plurality of compute resources to instantiate a further VNF to be executed by a second portion of the plurality of compute resources. The further VNF can include at least a further portion of the decomposition of the physical network function that supports at least a further portion of the telecommunications service. The VNF and the further VNF can be associated with the same or a different vendor. In this manner, the functionality provided by a decomposed physical network function can be provided by "best of breed" vendors for each constituent function.

In some embodiments, the cloud computing system also includes one or more application programming interfaces ("APIs"). The API(s) can expose the VNF for access by the telecommunications service.

In some embodiments, the service is a voice over long-term evolution ("VoLTE") service. In these embodiments, the set of service specific VNFs can include a session border controller ("SBC") signaling function, an SBC media function, an interworking function ("IWF"), a home subscriber server ("HSS") front-end function, a session control function, a registrar function, a transcoding function, a conferencing function, a mediation function, and/or a Communications Assistance for Law Enforcement Act ("CALEA") compliance function.

In some other embodiments, the service is a business voice over internet protocol ("VoIP") service such as, for example, IP FLEXIBLE REACH, available from AT&T. In these embodiments, the set of service specific VNFs can include an SBC signaling function, an SBC media function, an IWF, a transcoding function, an application server function, and/or a mediation function.

According to another aspect of the concepts and technologies disclosed herein, a method can include operations performed, at least in part, by a virtual machine monitor being executed by at least a portion of compute resources of a cloud computing system. The operations can include, for example, defining a set of VNFs to perform capabilities of a physical network function. The operations also can include exposing, an API to allow a service provider to access the set of VNFs to provide, at least in part, a telecommunications service. In some embodiments, the telecommunications service operates within one of layer 4 through layer 7 of the OSI communication model.

In some embodiments, the operations also can include storing, in a VNF catalog, the set of VNFs to perform the capabilities of the physical network function in association with the service.

In some embodiments, the operations also can include receiving, via the API, a request to instantiate the service that utilizes the set of VNFs. The operations also can include providing, in response to the request, the set of VNFs for use by the service.

In some embodiments, the set of virtual network functions comprises a session control function and a registrar function decomposed from a physical call session control function.

According to another aspect of the concepts and technologies disclosed herein, a network function architecture can include a compute resource and a set of VNFs that is executable by the compute resource. Each VNF of the set of VNFs can provide a capability of a physical network function that supports a service that operates within one of layer 4 through layer 7 of the OSI communication model.

In some embodiments, the set of virtual network functions can include a decomposition of the physical network function into constituent functions based upon capabilities of the physical network function so that the constituent functions can be independently instantiated by the hardware resource.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to a service centric virtual network function ("VNF") architecture for development and deployment of Open Systems Interconnection ("OSI") communication model layer 4 through layer 7 services in a cloud computing system. The VNF architecture overcomes at least the aforementioned problems by decomposing network hardware and software functions used for layer 4-7 services into a set of VNFs. This decomposition can be implemented in a granular manner to obtain the flexibility to instantiate only the VNF(s) that are to be used for a specific service and customize the VNF(s) with parameters specific to the service. In addition, VNFs can be grouped to optimize support for each service. The location of the VNFs also can be tailored to be service specific. Deployment decisions, such as centralized versus regional, can be made at the service level.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
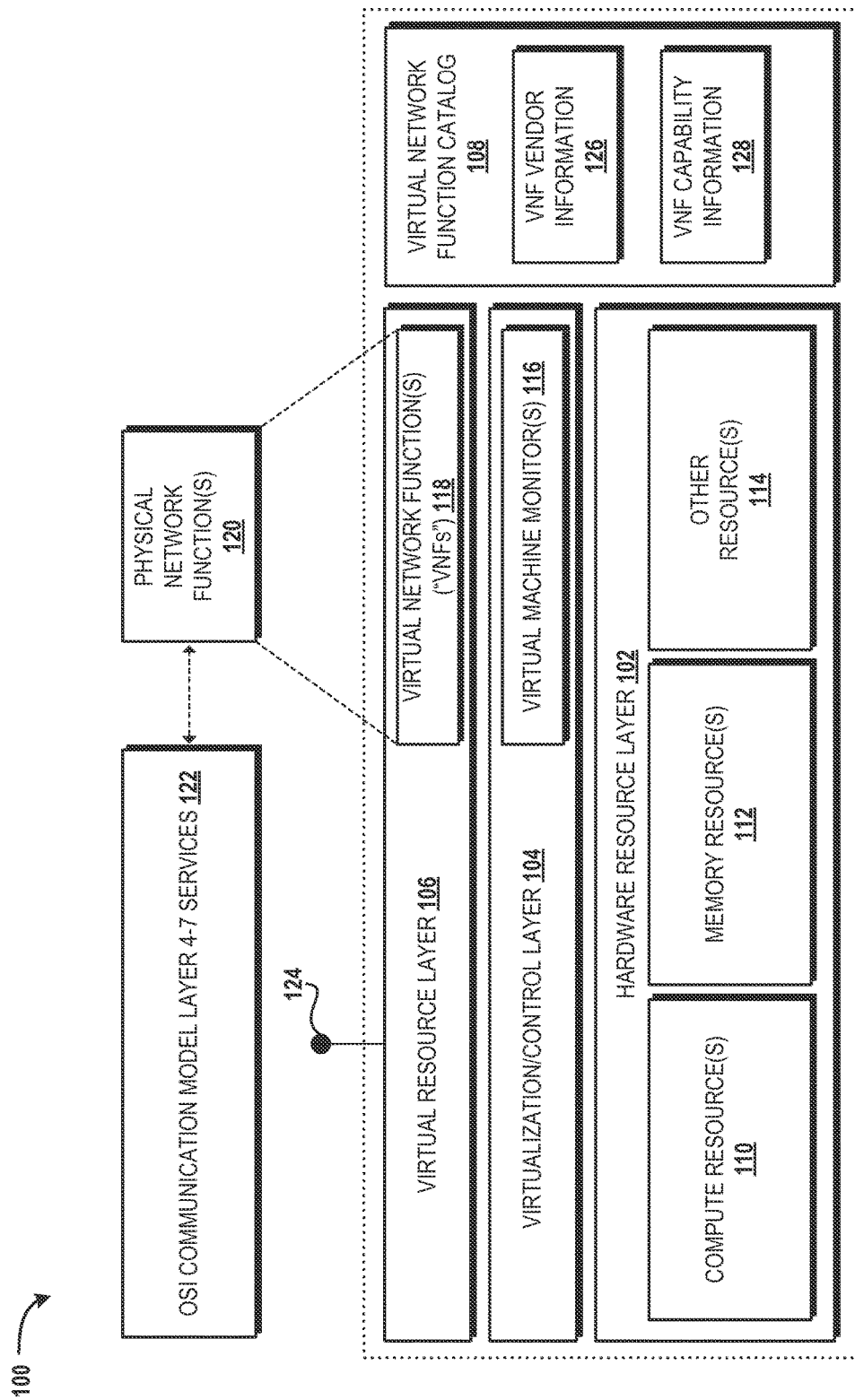
FIG. 1 is a block diagram illustrating aspects of an illustrative cloud computing system for implementing the various concepts and technologies disclosed herein.

Referring now to FIG. 1, aspects of a cloud computing system 100 for implementing various embodiments of the concepts and technologies disclosed herein will be described. The illustrated cloud computing system 100 includes a hardware resource layer 102, a virtualization/control layer 104, a virtual resource layer 106, and a virtual network function ("VNF") catalog 108.

The hardware resource layer 102 provides hardware resources, which, in the illustrated embodiment, include one or more compute resources 110, one or more memory resources 112, and one or more other resources 114. The compute resource(s) 110 can include one or more hardware components that perform computations to process data, and/or to execute computer-executable instructions of one or more application programs, operating systems, and/or other software. The compute resource(s) 110 can include one or more central processing units ("CPUs") configured with one or more processing cores. The compute resource(s) 110 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resource(s) 110 can include one or more discrete GPUs. In some other embodiments, the compute resource(s) 110 can include CPU and GPU components that are configured in accordance with a co-processing CPU/GPU computing model, wherein the sequential part of an application executes on the CPU and the computationally-intensive part is accelerated by the GPU. The compute resource(s) 110 can include one or more system-on-chip ("SoC") components along with one or more other components, including, for example, one or more of the memory resource(s) 112, and/or one or more of the other resource(s) 114. In some embodiments, the compute resource(s) 110 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resource(s) 110 can be or can include one or more hardware components architected in accordance with an ARM architecture, available for license from ARM HOLDINGS of Cambridge, United Kingdom. Alternatively, the compute resource(s) 110 can be or can include one or more hardware components architected in accordance with an x86 architecture, such an architecture available from INTEL CORPORATION of Mountain View, Calif., and others. Those skilled in the art will appreciate the implementation of the compute resource(s) 110 can utilize various computation architectures, and as such, the compute resource(s) 110 should not be construed as being limited to any particular computation architecture or combination of computation architectures, including those explicitly disclosed herein.

The memory resource(s) 112 can include one or more hardware components that perform storage operations, including temporary or permanent storage operations. In some embodiments, the memory resource(s) 112 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resource(s) 110.

The other resource(s) 114 can include any other hardware resources that can be utilized by the compute resources(s) 110 and/or the memory resource(s) 112 to perform operations described herein. The other resource(s) 114 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 102 can be virtualized by one or more virtual machine monitors ("VMMs") 116 (also known as "hypervisors") operating within the virtualization/control layer 104 to create one or more virtual resources that reside in the virtual resource layer 106. The VMMs 116 can be or can include software, firmware, and/or hardware that alone or in combination with other software, firmware, and/or hardware, creates one or more virtual resources operating within the virtual resource layer 106.

The virtual resources operating within the virtual resource layer 106 can include abstractions of at least a portion of the compute resource(s) 110, the memory resource(s) 112, and/or the other resource(s) 114, or any combination thereof. In the illustrated embodiment, the virtual resource layer 106 includes one or more special-purpose virtual machines referred to herein as virtual network functions ("VNFs") 118. The VNFs 118 can be virtualizations of any physical network functions 120, or portions thereof, which perform, at least in part, one or more operations to support one or more OSI communication layer 4-7 services 122. This decomposition can be implemented in a granular manner to obtain the flexibility to instantiate only the VNF(s) that are to be used for a specific service. In addition, VNFs can be grouped to optimize support for each service. The location of the VNFs also can be tailored to be service specific. Deployment decisions, such as centralized versus regional, can be made at the service level. An example of decomposition of one of the physical network functions 120 into a set of VNFs is illustrated and described herein with reference to FIG. 2.

Layer 4 of the OSI communication model, also known as the Transport Layer, ensures end-to-end delivery of messages for both "connection-mode" data such as transfer control protocol ("TCP") connections and "connectionless-mode" data such as user datagram protocol ("UDP") datagrams. For both modes, the endpoints of communication are identified by port numbers such as TCP port 80 or UDP port 161.

Layer 5 of the OSI communication model, also known as the Session Layer, provides services for coordinating communication between applications and synchronizing message delivery. For example, a protocol with suspend and resume or checkpoint and rollback capabilities includes session layer services such as, for example, International Telecommunication Union ("ITU") X.225, APPLETALK available from APPLE INC., and remote procedure call ("RPC").

Layer 6 of the OSI communication model, also known as the Presentation Layer, provides services for converting data from local format (i.e., abstract syntax) into a machine-independent format (i.e., transfer syntax). Some application protocols are defined in Abstract Syntax Notation One ("ASN.1") notation. ASN. 1 defines a set of data structures mapped to encoding rules, for example, how an Integer should be encoded into a bit string to be transmitted to and decoded by a recipient using XML Encoding Rules (XER).

Layer 7 of the OSI communication model, also known as the Application Layer, provides common services used by applications to establish, release, and abort communication with each other, as well as specific services. Most applications function within layer 7.

The VNFs 118 can form the basis for a software defined services framework ("SDSF"). The SDSF provides a service centric VNF architecture in which the physical network function(s) 120 that support the OSI communication model layer 4-7 services 122 can be decomposed into smaller granular network functions as the VNFs 118. The VNFs 118 form the basis of the SDSF to enable rapid development and deployment of the OSI communication model layer 4-7 services 122. In addition, the SDSF can be made available to external customers (not shown) to instantiate services that run within the cloud computing system 100. The illustrated virtual resource layer 106 can expose one or more application programming interfaces ("APIs") 124 to allow service providers and/or other entities to access the VNFs 118 to create the layer 4-7 services 122 and/or other services (not shown).

The VNF catalog 108 can store VNF vendor information 126. The VNF vendor information 126 can identify one or more vendors that provide one or more of the VNFs 118. The VNF catalog 108 also can store VNF capability information 128 that can include a catalog of capabilities that can be mapped, for example, to one or more vendors identified in the VNF vendor information 126. In this manner, the VNF catalog 108 can provide information regarding "best-in-breed" vendors for the VNFs 118 that encompass a broad range of capabilities. In other words, the VNF catalog 108 can be created to encompass all vendors and all VNFs available via the cloud computing system.

Figure 2:
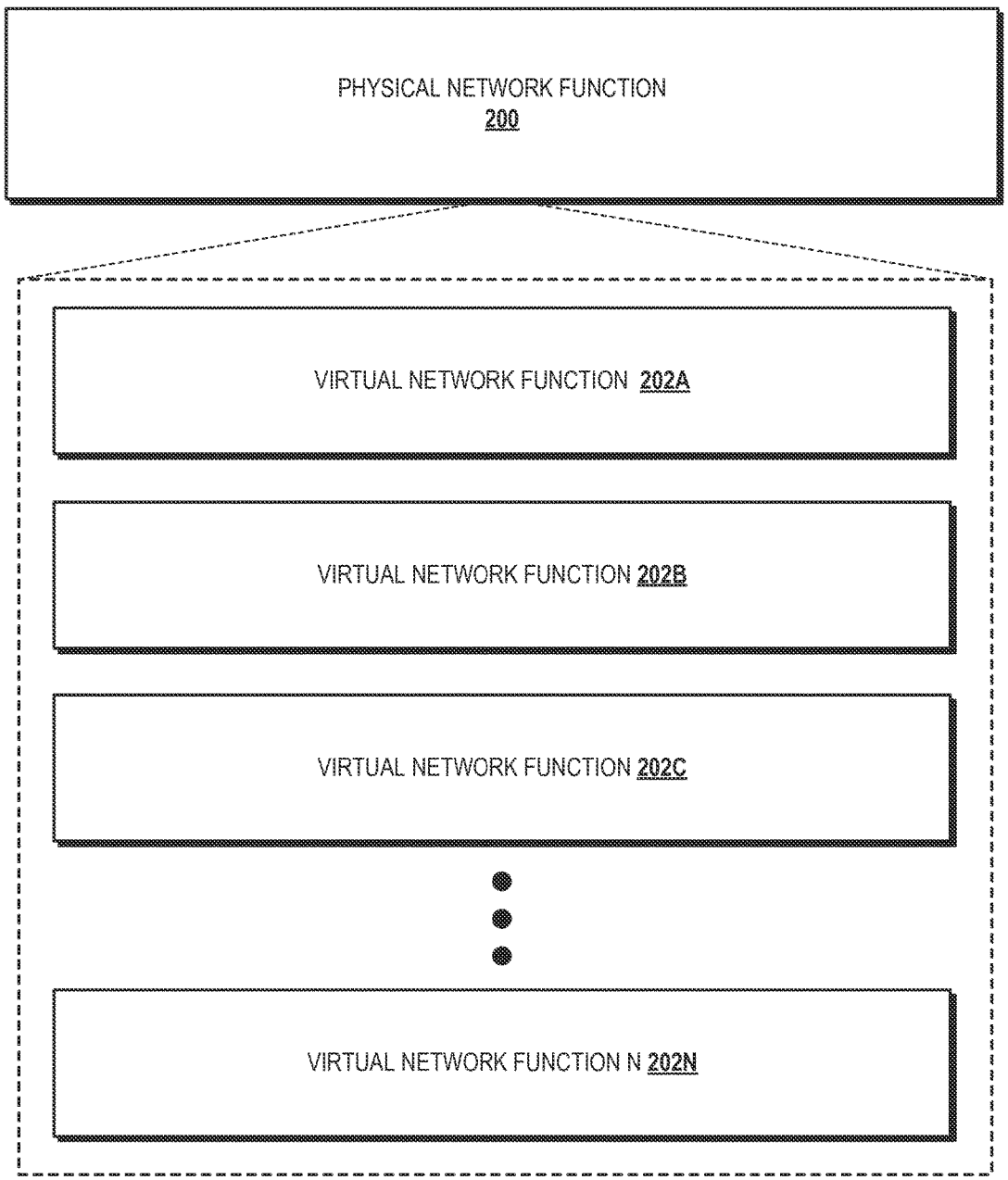
FIG. 2 is a block diagram illustrating aspects of a physical network function decomposed into a set of virtual network functions ("VNFs"), according to an illustrative embodiment.

Turning now to FIG. 2, a block diagram illustrating aspects of a physical network function 200, such as one of the physical network functions 120 (shown in FIG. 1), that is decomposed into a set of VNFs 202A-202N (hereinafter "set of VNFs 202"), such as the VNFs 118 is provided, according to an illustrative embodiment. Although the illustrated set of VNFs 202 includes four VNFs, the set of VNFs 202 can include any number of VNFs, and as such, the illustrated example of the set of VNFs 202 containing four VNFs should not be construed as being limiting in any way. When a service is to be instantiated, the set of VNFs 202 that is to be utilized to support the service and the capacity to support the service can be enabled with a specific configuration that applies to the service. The following examples of the physical network function 200 and the set of VNFs 202 that can be decomposed from the physical network function 200 should not be construed as being limiting in any way.

For voice over long-term evolution ("VoLTE"), for example, the set of VNFs 202 can include: one or more session border controller ("SBC") signaling VNFs, one or more SBC media VNFs, one or more interworking function ("IWF") VNFs, one or more home subscriber server front end ("HSS-FE") VNFs, one or more session control VNFs, one or more registrar VNFs, one or more transcoding VNFs, one or more conferencing VNFs, one or more mediation VNFs, and one or more Communications Assistance for Law Enforcement Act ("CALEA") compliance VNFs. The number and configuration of each VNF of the set of VNFs 202 can be instantiated to meet a desired capacity for the VoLTE service. In this manner, the number and type of VNFs can be instantiated for specific functions that are used by the VoLTE service, thus increasing efficiency and enabling nimble service delivery and capacity adjustment as the VoLTE service changes over time.

As another example, for business voice over internet protocol ("VoIP"), such as, for example, IP FLEXIBLE REACH, available from AT&T, the set of VNFs 202 can include: SBC signaling, SBC Media, IWF, transcoding, and mediation. For a service like IPFR, instantiation can be on a per customer basis to enable additional flexibility and an efficient use of resources.

As yet another example, an SBC function can be decomposed into the set of VNFs 202, including signaling, media, interworking, and transcoding VNFs. All services and even all sessions within the scope of a service that uses the SBC might not require transcoding functionality, for example. As such, decomposing the transcoding functionality of an SBC function into separate VNFs allows the service to utilize the transcoding VNF on an as-needed basis, and therefore instantiate the transcoding VNF more efficiently.

As another example, a call session control function ("CSCF") can be decomposed into a session control VNF and a registrar VNF. Some services, such as business VoIP, might not utilize registration functions, and therefore the registrar VNF can be instantiated as-needed for services that do utilize registration functions.

Figure 3:
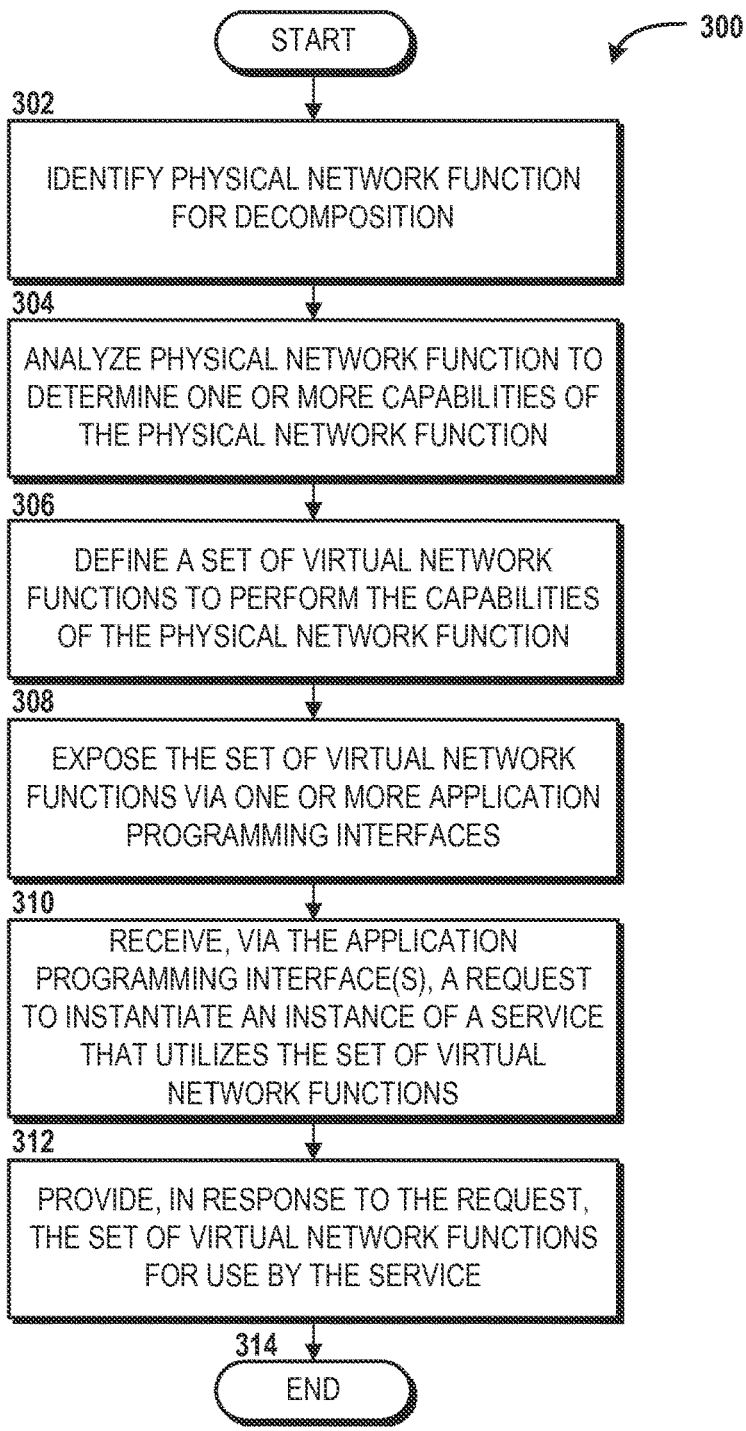
FIG. 3 is a flow diagram illustrating aspects of a method for decomposing a physical network function into a set of VNFs and exposing the set of VNFs for use by Open Systems Interconnection ("OSI") communication model layers 4-7 services in a cloud computing system, according to an illustrative embodiment.

Turning now to FIG. 3, aspects of a method 300 for decomposing the physical network function 200 (shown in FIG. 2) into the set of VNFs 202 (also shown in FIG. 2) and exposing the set of VNFs 202 for use by the OSI communication model layers 4-7 services 122 in the cloud computing system 100 are provided, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor, such as, for example, one of the compute resources 110 of the hardware resource layer 102 and/or a processor one or more other computing systems, devices, engines, or components disclosed herein to perform operations. It should be understood that the performance of one or more operations may include operations executed by one or more virtual processors at the instructions of one or more of the aforementioned hardware processors.

The method 300 will be described with reference to FIG. 3 and further reference to FIGS. 1 and 2. The method 300 begins at operation 302, where the physical network function 200 is identified for decomposition. From operation 302, the method 300 proceeds to operation 304, where the physical network function 200 is analyzed to determine one or more capabilities of the physical network function 200. From operation 304, the method 300 proceeds to operation 306, where the set of VNFs 202 is defined. The set of VNFs 202 includes one or more VNFs that can perform the one or more capabilities of the physical network function 200 as determined at operation 304.

From operation 306, the method 300 proceeds to operation 308, where the set of VNFs 202 is exposed via one or more APIs, such as the API(s) 124 (shown in FIG. 1). From operation 308, the method 300 proceeds to operation 310, where a request is received via the API(s) 124. The request can be to instantiate a service that utilizes at least a portion of the set of VNFs 202. From operation 310, the method 300 proceeds to operation 312, where, in response to the request, the set of VNFs 202 is provided for use by the service.

From operation 312, the method 300 proceeds to operation 314. The method 300 ends at operation 314.

Figure 4:
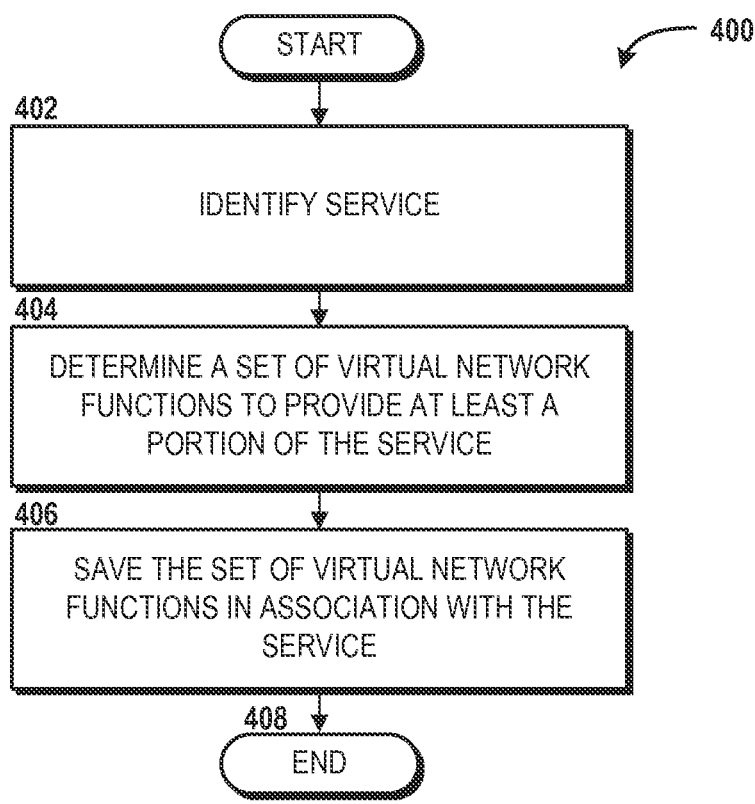
FIG. 4 is a flow diagram illustrating aspects of a method for saving a set of VNFs in association with a service, according to an illustrative embodiment.

Turning now to FIG. 4, aspects of a method 400 for saving a set of VNFs, such as the set of VNFs 202 (shown in FIG. 2), in association with a service will be described, according to an illustrative embodiment. The method 400 begins and proceeds to operation 402, where a service is identified. From operation 402, the method 400 proceeds to operation 404, where the set of VNFs 202 to provide at least a portion of the service identified is determined. From operation 404, the method 400 proceeds to operation 406, where the set of VNFs 202 is saved in association with the service. For example, the set of VNFs 202 determined at operation 404 can be saved in the VNF catalog 108 in association with the service. Moreover, the set of VNFs 202 may be associated with one or more vendors that provide the set of VNFs 202. From operation 406, the method 400 proceeds to operation 408. The method 400 ends at operation 408.

Figure 5:
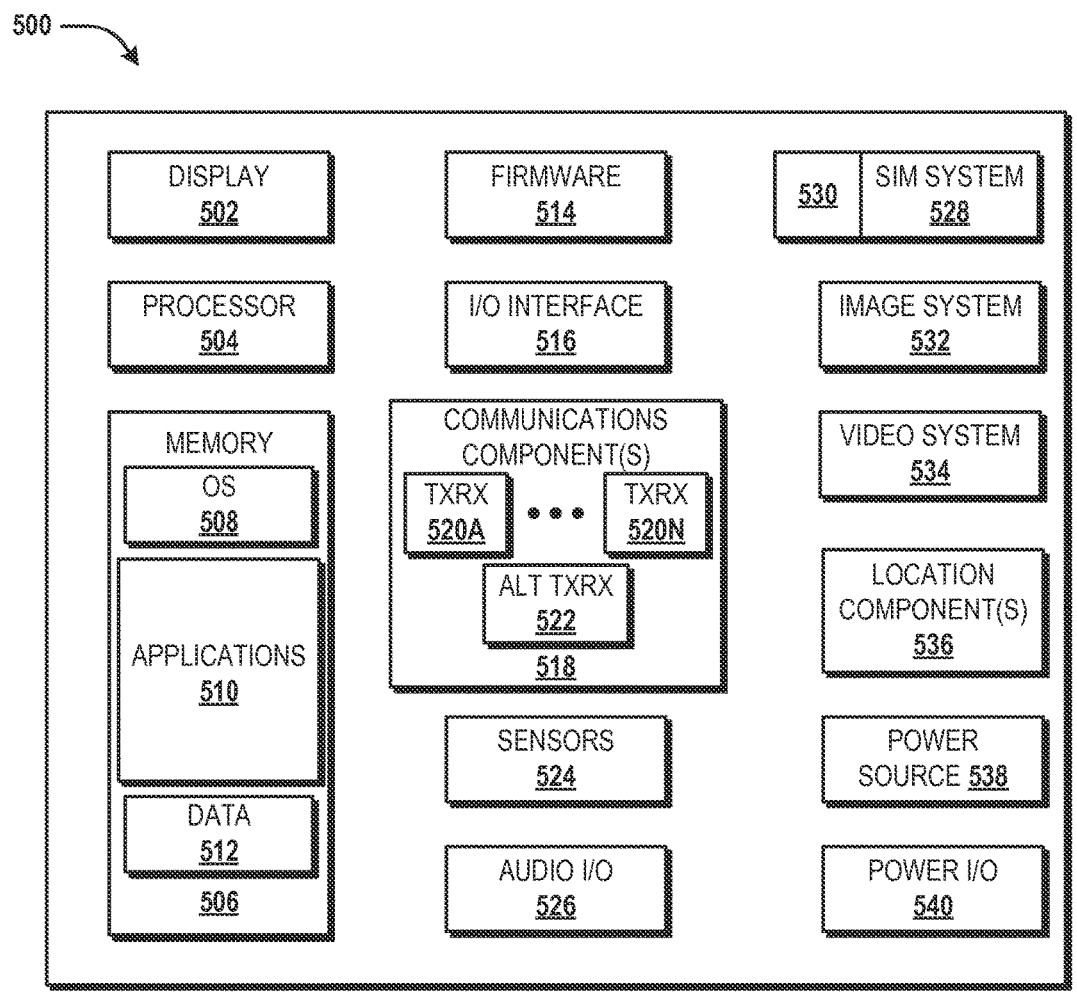
FIG. 5 is a block diagram illustrating an example mobile device capable of implementing aspects of the embodiments disclosed herein.

Turning now to FIG. 5, an illustrative mobile device 500 and components thereof will be described. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable system in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, one or more identifiers, and/or other applications or program modules. According to various embodiments, the data 512 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1344 ("FIREWIRE") port, a serial port, a parallel port, an Ethernet (RJ55) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating system for various embodiments of the concepts and technologies described herein. The described embodiment of the mobile device 500 is illustrative, and should not be construed as being limiting in any way.

Figure 6:
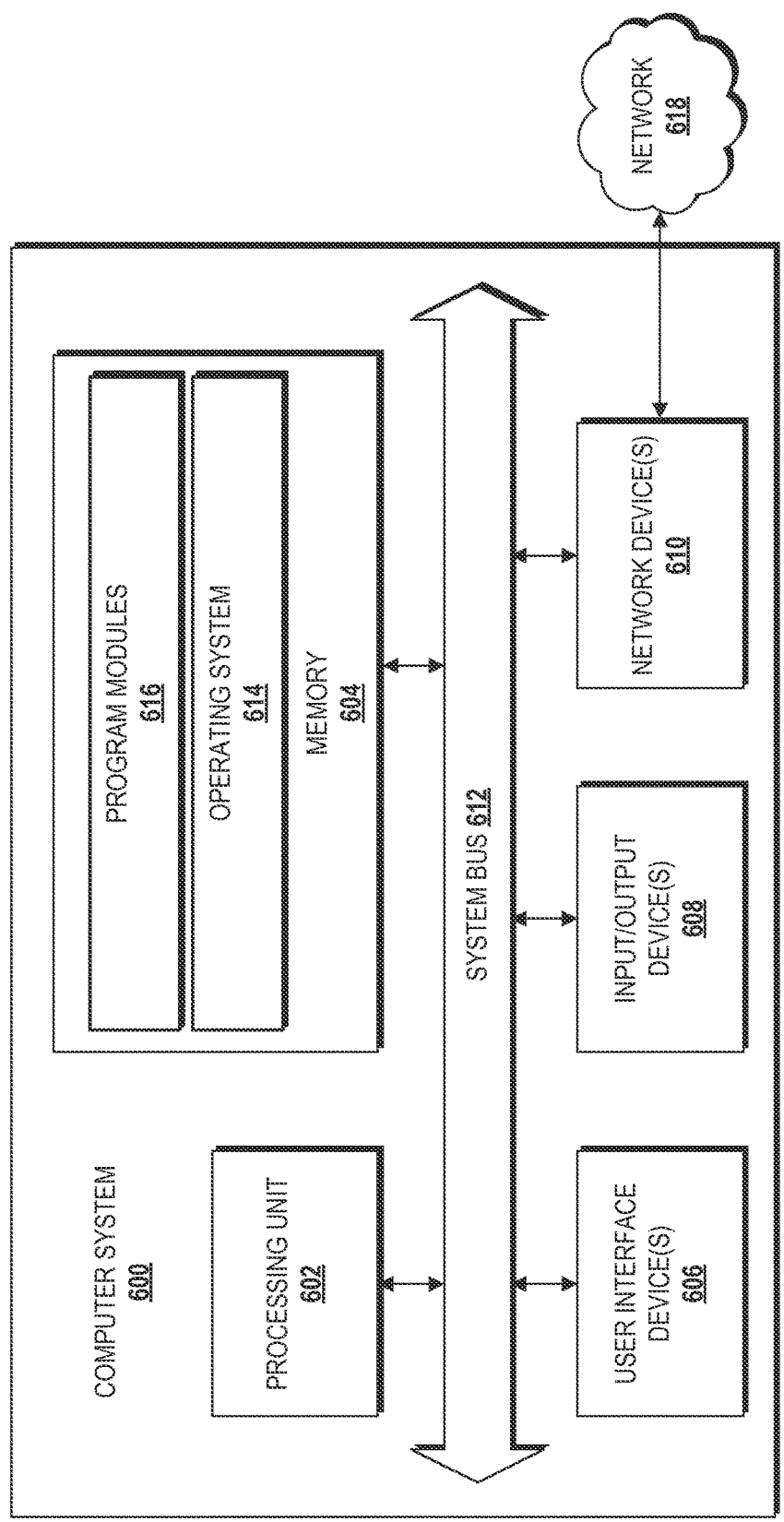
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some implementations, the hardware resource layer 102 (illustrated in FIG. 1) includes one or more computers that are configured like the architecture of the computer system 600. The computer system 600 may provide at least a portion of the compute resources 110, the memory resources 112, and/or the other resources 114. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 110 (illustrated in FIG. 1) can include one or more processing units 602.

The memory 604 communicates with the processing unit 602 via the system bus 612. In some embodiments, the memory 604 is operatively connected to a memory controller (not shown) that enables communication with the processing unit 602 via the system bus 612. The memory resources 112 can include one or more instances of the memory 604. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be a wired network such as, but not limited to, a Wide Area Network ("WAN"), a wired Personal Area Network ("PAN"), or a wired Metropolitan Area Network ("MAN"). The network 618 may be any other network described herein.

Figure 7:
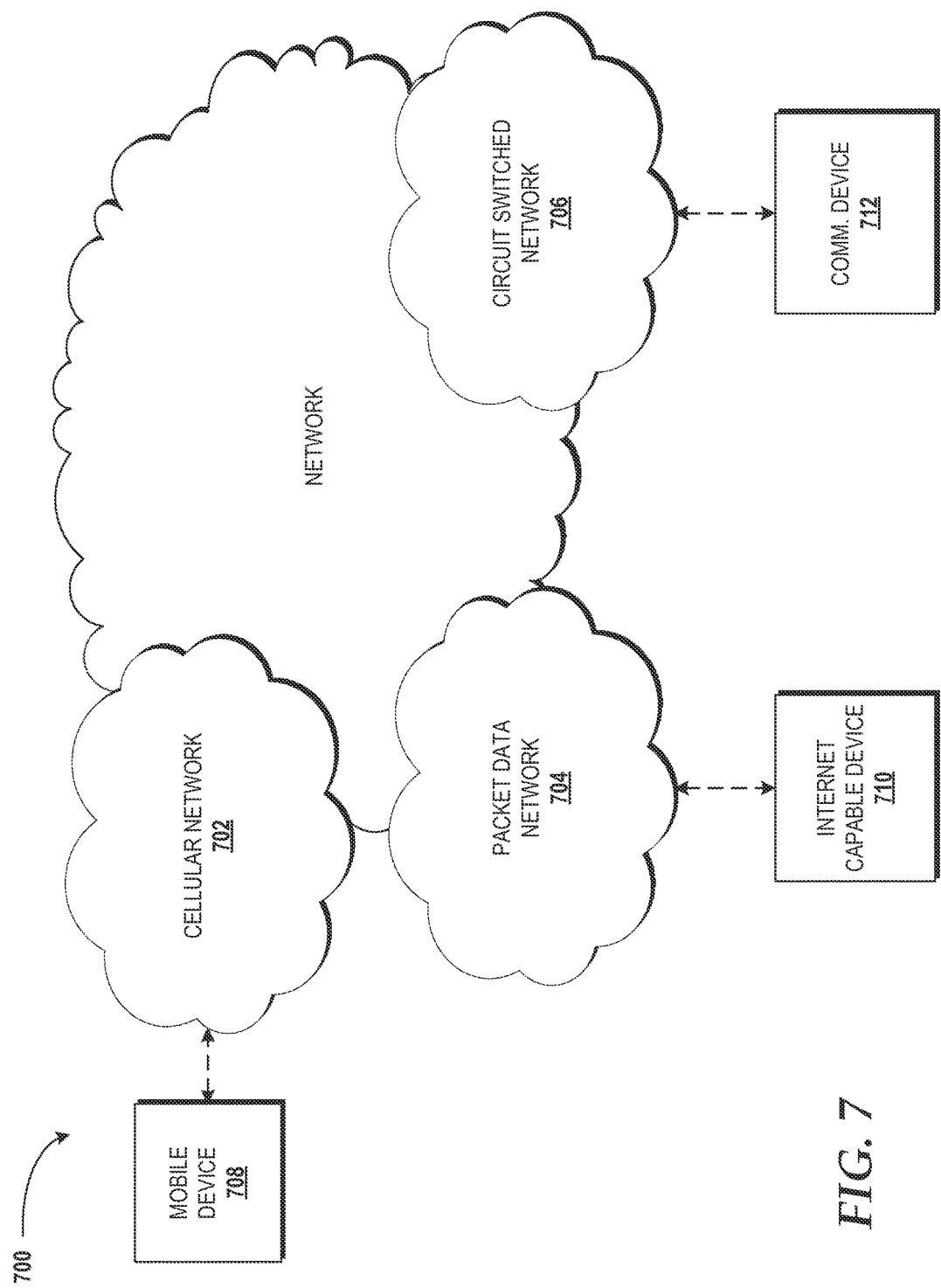
FIG. 7 is a diagram illustrating a network, according to an illustrative embodiment.

Turning now to FIG. 7, details of a network 700 are illustrated, according to an illustrative embodiment. The network 700 includes a cellular network 702, a packet data network 704, for example, the Internet, and a circuit switched network 706, for example, a PSTN. The cellular network 702 includes various components such as, but not limited to, base transceiver stations ("BTSs"), Node-B's or e-Node-B's, base station controllers ("BS Cs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with one another, as is generally known. The packet data network 704 can be or can include at least a portion of the cloud computing system 100 illustrated and described with reference to FIG. 1. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a POTS. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, the unmanaged TDM device 106, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network is used to refer broadly to any combination of the networks 1202, 1204, 1206. It should be appreciated that substantially all of the functionality described with reference to the network 120 can be performed by the cellular network 702, the packet data network 704, and/or the circuit switched network 706, alone or in combination with other networks, network elements, and the like.

Based on the foregoing, it should be appreciated that concepts and technologies directed to a service centric VNF architecture for development and deployment of OSI communication model layer 4 through layer 7 services in a cloud computing system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A cloud computing system comprising:
an application programming interface;
a plurality of compute resources;
a plurality of memory resources, wherein a portion of the plurality of memory resources comprises instructions that, when executed by a first portion of the plurality of compute resources, causes the first portion of the plurality of compute resources to perform operations; and
a virtual network function catalog that stores virtual network function vendor information and virtual network function capability information associated with a plurality of virtual network functions, wherein the virtual network function vendor information identifies a plurality of vendors, wherein a first vendor of the plurality of vendors provides a first virtual network function of the plurality of virtual network functions, and a second vendor of the plurality of vendors provides a second virtual network function of the plurality of virtual network functions, wherein the virtual network function capability information comprises a plurality of capabilities of the plurality of virtual network functions and the plurality of capabilities are mapped to the plurality of vendors, and wherein the plurality of virtual network functions are made available to a telecommunications service provider via the application programming interface through which the telecommunications service provider can request instantiation of the first virtual network function provided by the first vendor of the plurality of vendors and the second virtual network function provided by the second vendor of the plurality of vendors to support, at least in part, the telecommunications service provider in providing, at least in part, a telecommunications service, wherein the first virtual network function comprises first software instructions derived from a first decomposition of a first physical network function provided by the first vendor, and wherein the second virtual network function of comprises second software instructions derived from a second decomposition of a second physical network function provided by the second vendor;

wherein the operations comprise
receiving, via the application programming interface, a request from the telecommunications service provider to instantiate the first virtual network function and the second virtual network function, and
in response to the request, instantiating, for the telecommunications service provider, the first virtual network function and the second virtual network function to be executed by at least a second portion of the plurality of compute resources; and wherein
the first physical network function provides a plurality of first functions,
the second physical network function provides a plurality of second functions,
the first virtual network function comprising the first software instructions derived from the first decomposition of the first physical network function provided by the first vendor provides at least a first function of the plurality of first functions, and
the second virtual network function comprising the second software instructions derived from the second decomposition of the second physical network function provided by the second vendor provides at least a second function of the plurality of second functions.

2. The cloud computing system of claim 1, wherein:
the telecommunications service comprises a voice over long-term evolution service; and
the plurality of first functions and the plurality of second functions collectively comprise
a session border controller signaling function, a session border controller media function, an interworking function, a home subscriber server front-end function, a session control function, a registrar function, a transcoding function, a conferencing function, a mediation function, and a Communications Assistance for Law Enforcement Act compliance function.

3. The cloud computing system of claim 1, wherein:
the telecommunications service comprises a voice over internet protocol service; and
the plurality of first functions and the plurality of second functions collectively comprise
a session border controller signaling function, a session border controller media function, an interworking function, a transcoding function, an application server function, and a mediation function.

4. The cloud computing system of claim 1, wherein the virtual network function catalog further comprises a first identification of the first virtual network function and a second identification of the second virtual network function in association with the telecommunications service.

5. The cloud computing system of claim 1, wherein:
the first physical network function comprises a first session border controller;
the plurality of first functions comprises a first signaling function, a first media function, a first interworking function, and a first transcoding function;
the second physical network function comprises a second session border controller; and
the plurality of second functions comprises a second signaling function, a second media function, a second interworking function, and a second transcoding function.

6. The cloud computing system of claim 1, wherein:
the first physical network function comprises a first call session control function;
the plurality of first functions comprises a first session control function and a first registrar function;
the second physical network function comprises a second call session control function; and
the plurality of second functions comprises a second session control function and a second registrar function.

7. A method comprising:
defining, by at least a first portion of a plurality of compute resources of a cloud computing system via execution of instructions, virtual network function vendor information and virtual network function capability information associated with a plurality of virtual network functions, wherein the virtual network function vendor information identifies a plurality of vendors, wherein a first vendor of the plurality of vendors provides a first virtual network function of the plurality of virtual network functions, and a second vendor of the plurality of vendors provides a second virtual network function of the plurality of virtual network functions, wherein the virtual network function capability information comprises a plurality of capabilities of the plurality of virtual network functions and the plurality of capabilities are mapped to the plurality of vendors, and wherein the plurality of virtual network functions are made available to a telecommunications service provider via an application programming interface through which the telecommunications service provider can request instantiation of the first virtual network function provided by the first vendor of the plurality of vendors and the second virtual network function provided by the second vendor of the plurality of vendors to support, at least in part, the telecommunications service provider in providing, at least in part, a telecommunications service, wherein the first virtual network function comprises first software instructions derived from a first decomposition of a first physical network function provided by the first vendor, and wherein the second virtual network function of comprises second software instructions derived from a second decomposition of a second physical network function provided by the second vendor;
causing, by the cloud computing system, the virtual network function vendor information and the virtual network function capability information associated with the plurality of virtual network functions to be stored in a virtual network function catalog;
receiving, via the application programming interface, a request from the telecommunications service provider to instantiate the first virtual network function and the second virtual network function; and
in response to the request, instantiating, for the telecommunications service provider, the first virtual network function and the second virtual network function to be executed by at least a second portion of the plurality of compute resources of the cloud computing system;

wherein
the first physical network function provides a plurality of first functions,
the second physical network function provides a plurality of second functions,
the first virtual network function comprising the first software instructions derived from the first decomposition of the first physical network function provided by the first vendor provides at least one first function of the plurality of first functions, and
the second virtual network function comprising the second software instructions derived from the second decomposition of the second physical network function provided by the second vendor provides at least one second function of the plurality of second functions.

8. The method of claim 7, wherein the telecommunications service operates within one of layer 4 through layer 7 of the open systems interconnection communication model.

9. The method of claim 7, wherein:
the telecommunications service comprises a voice over long-term evolution service; and
the plurality of first functions and the plurality of second functions collectively comprise
a session border controller signaling function, a session border controller media function, an interworking function, a home subscriber server front-end function, a session control function, a registrar function, a transcoding function, a conferencing function, a mediation function, and a Communications Assistance for Law Enforcement Act compliance function.

10. The method of claim 7, wherein:
the telecommunications service comprises a voice over internet protocol service; and
the plurality of first functions and the plurality of second functions collectively comprise
a session border controller signaling function, a session border controller media function, an interworking function, a transcoding function, an application server function, and a mediation function.

11. The method of claim 7, further comprising saving, by the cloud computing system, a first identification of the first virtual network function and a second identification of the second virtual network function in association with the telecommunications service.

12. The method of claim 7, wherein:
the first physical network function comprises a first session border controller;
the plurality of first functions comprises a first signaling function, a first media function, a first interworking function, and a first transcoding function;
the second physical network function comprises a second session border controller; and
the plurality of second functions comprises a second signaling function, a second media function, a second interworking function, and a second transcoding function.

13. The method of claim 7, wherein:
the first physical network function comprises a first call session control function;
the plurality of first functions comprises a first session control function and a first registrar function;
the second physical network function comprises a second call session control function; and
the plurality of second functions comprises a second session control function and a second registrar function.

14. A computer-readable storage medium comprising computer-executable instructions that, when executed by a first portion of a plurality of compute resources of a cloud computing system, cause the cloud computing system to perform operations comprising:
defining virtual network function vendor information and virtual network function capability information associated with a plurality of virtual network functions, wherein the virtual network function vendor information identifies a plurality of vendors, wherein a first vendor of the plurality of vendors provides a first virtual network function of the plurality of virtual network functions, and a second vendor of the plurality of vendors provides a second virtual network function of the plurality of virtual network functions, wherein the virtual network function capability information comprises a plurality of capabilities of the plurality of virtual network functions and the plurality of capabilities are mapped to the plurality of vendors, and wherein the plurality of virtual network functions are made available to a telecommunications service provider via an application programming interface through which the telecommunications service provider can request instantiation of the first virtual network function provided by the first vendor of the plurality of vendors and the second virtual network function provided by the second vendor of the plurality of vendors to support, at least in part, the telecommunications service provider in providing, at least in part, a telecommunications service, wherein the first virtual network function comprises first software instructions derived from a first decomposition of a first physical network function provided by the first vendor, and wherein the second virtual network function of comprises second software instructions derived from a second decomposition of a second physical network function provided by the second vendor;
causing, by the cloud computing system, the virtual network function vendor information and the virtual network function capability information associated with the plurality of virtual network functions to be stored in a virtual network function catalog;
receiving, via the application programming interface, a request from the telecommunications service provider to instantiate the first virtual network function and the second virtual network function; and
in response to the request, instantiating, for the telecommunications service provider, the first virtual network function and the second virtual network function to be executed by at least a second portion of the plurality of compute resources of the cloud computing system;
wherein
the first physical network function provides a plurality of first functions,
the second physical network function provides a plurality of second functions,
the first virtual network function comprising the first software instructions derived from the first decomposition of the first physical network function provided by the first vendor provides at least a first function of the plurality of first functions, and
the second virtual network function comprising the second software instructions derived from the second decomposition of the second physical network function provided by the second vendor provides at least a second function of the plurality of second functions.

15. The computer-readable storage medium of claim 14, wherein:
 the telecommunications service comprises a voice over long-term evolution service; and
 the plurality of first functions and the plurality of second functions collectively comprise
 comprises a session border controller signaling function, a session border controller media function, an interworking function, a home subscriber server front-end function, a session control function, a registrar function, a transcoding function, a conferencing function, a mediation function, and a Communications Assistance for Law Enforcement Act compliance function.

16. The computer-readable storage medium of claim 14, wherein:
 the telecommunications service comprises a voice over internet protocol service; and
 the plurality of first functions and the plurality of second functions collectively comprise
 comprises a session border controller signaling function, a session border controller media function, an interworking function, a transcoding function, an application server function, and a mediation function.

17. The computer-readable storage medium of claim 14, wherein the operations further comprising saving a first identification of the first virtual network function and a second identification of the second virtual network function in association with the telecommunications service.

18. The computer-readable storage medium of claim 14, wherein:
 the first physical network function comprises a first session border controller;
 the plurality of first functions comprises a first signaling function, a first media function, a first interworking function, and a first transcoding function;
 the second physical network function comprises a second session border controller;
 the plurality of second functions comprises a second signaling function, a second media function, a second interworking function, and a second transcoding function.

19. The computer-readable storage medium of claim 14, wherein:
 the first physical network function comprises a first call session control function;
 the plurality of first functions comprises a first session control function and a first registrar function;
 the second physical network function comprises a second call session control functions;
 the plurality of second functions comprises a second session control function and a second registrar function.

\* \* \* \* \*